US012183035B1

(12) United States Patent
Chen

(10) Patent No.: US 12,183,035 B1
(45) Date of Patent: Dec. 31, 2024

(54) SYSTEM AND METHOD FOR POSITIONING A 3D EYEGLASSES MODEL

(71) Applicant: META PLATFORMS, INC., Menlo Park, CA (US)

(72) Inventor: Shenchang Eric Chen, Bellevue, WA (US)

(73) Assignee: META PLATFORMS, INC., Menlo Park, CA (US)

( * ) Notice: Subject to any disclaimer, the term of this patent is extended or adjusted under 35 U.S.C. 154(b) by 264 days.

(21) Appl. No.: 17/687,268

(22) Filed: Mar. 4, 2022

Related U.S. Application Data

(60) Provisional application No. 63/158,304, filed on Mar. 8, 2021.

(51) Int. Cl.
| | | |
|---|---|---|
| *G06K 9/00* | (2022.01) | |
| *G06T 7/73* | (2017.01) | |
| *G06T 17/10* | (2006.01) | |
| *G06T 19/20* | (2011.01) | |

(52) U.S. Cl.
CPC .............. *G06T 7/75* (2017.01); *G06T 17/10* (2013.01); *G06T 19/20* (2013.01); *G06T 2207/20224* (2013.01); *G06T 2207/30201* (2013.01); *G06T 2219/2004* (2013.01)

(58) Field of Classification Search
CPC ........... G06T 7/75; G06T 17/10; G06T 19/20; G06T 2207/20224; G06T 2207/30201; G06T 2219/2004
See application file for complete search history.

(56) References Cited

U.S. PATENT DOCUMENTS

| | | |
|---|---|---|
| 6,072,467 A | 6/2000 | Walker |
| 6,556,196 B1 | 4/2003 | Blanz et al. |
| 6,842,175 B1 | 1/2005 | Schmalstieg et al. |

(Continued)

FOREIGN PATENT DOCUMENTS

| | | | |
|---|---|---|---|
| CN | 107330969 A | * | 11/2017 |
| CN | 113050795 A | | 6/2021 |

(Continued)

OTHER PUBLICATIONS

Eye landmarks detection via weakly supervised learning, Bin Huang et al., Elsevier, 2019, pp. 1-11 (Year: 2019).*

(Continued)

*Primary Examiner* — Jayesh A Patel
(74) *Attorney, Agent, or Firm* — Potomac Law Group, PLLC; Dannon G. Allbee

(57) ABSTRACT

In some embodiments, a computer-implemented method includes obtaining a without-eyeglasses face scan of a subject, the without-eyeglasses face scan being a three-dimensional (3D) model of a face of the subject without eyeglasses; obtaining a with-eyeglasses face scan of the subject, the with-eyeglasses face scan being a 3D model of the subject with eyeglasses; and using the without-eyeglasses face scan and the with-eyeglasses face scan to place a 3D eyeglasses model on a face model of the subject. In some embodiments of the computer-implemented method, the 3D eyeglasses model is placed on the face model of the subject using frame placement information generated using the without-eyeglasses face scan and the with-eyeglasses face scan.

20 Claims, 10 Drawing Sheets

(56) References Cited

U.S. PATENT DOCUMENTS

| | | |
|---|---|---|
| 7,701,439 B2 | 4/2010 | Hillis et al. |
| 8,026,918 B1 | 9/2011 | Murphy |
| D683,749 S | 6/2013 | Hally |
| D689,874 S | 9/2013 | Brinda et al. |
| 8,947,351 B1 | 2/2015 | Noble |
| D726,219 S | 4/2015 | Chaudhri et al. |
| D727,352 S | 4/2015 | Ray et al. |
| D727,354 S | 4/2015 | Park et al. |
| D733,740 S | 7/2015 | Lee et al. |
| 9,117,274 B2 | 8/2015 | Liao et al. |
| 9,292,089 B1 | 3/2016 | Sadek |
| D761,273 S | 7/2016 | Kim et al. |
| D763,279 S | 8/2016 | Jou |
| 9,477,368 B1 | 10/2016 | Filip et al. |
| D775,179 S | 12/2016 | Kimura et al. |
| D775,196 S | 12/2016 | Huang et al. |
| 9,530,252 B2 | 12/2016 | Poulos et al. |
| D780,794 S | 3/2017 | Kisielius et al. |
| D781,905 S | 3/2017 | Nakaguchi et al. |
| D783,037 S | 4/2017 | Hariharan et al. |
| D784,394 S | 4/2017 | Laing et al. |
| D784,395 S | 4/2017 | Laing et al. |
| D787,527 S | 5/2017 | Wilberding |
| D788,136 S | 5/2017 | Jaini et al. |
| D788,793 S | 6/2017 | Ogundokun et al. |
| D789,416 S | 6/2017 | Baluja et al. |
| D789,977 S | 6/2017 | Mijatovic et al. |
| D790,567 S | 6/2017 | Su et al. |
| D791,823 S | 7/2017 | Zhou |
| D793,403 S | 8/2017 | Cross et al. |
| 9,770,203 B1 | 9/2017 | Berme et al. |
| 9,817,472 B2 | 11/2017 | Lee et al. |
| D817,994 S | 5/2018 | Jou |
| D819,065 S | 5/2018 | Xie et al. |
| D824,951 S | 8/2018 | Kolbrener et al. |
| D828,381 S | 9/2018 | Lee et al. |
| D829,231 S | 9/2018 | Hess et al. |
| D831,681 S | 10/2018 | Eilertsen |
| D835,665 S | 12/2018 | Kimura et al. |
| 10,168,768 B1 | 1/2019 | Kinstner |
| D842,889 S | 3/2019 | Krainer et al. |
| 10,220,303 B1 | 3/2019 | Schmidt et al. |
| 10,248,284 B2 | 4/2019 | Itani et al. |
| D848,474 S | 5/2019 | Baumez et al. |
| D850,468 S | 6/2019 | Malahy et al. |
| D851,123 S | 6/2019 | Turner |
| D853,431 S | 7/2019 | Sagrillo et al. |
| D854,551 S | 7/2019 | Pistiner et al. |
| D856,366 S | 8/2019 | Richardson |
| D859,426 S | 9/2019 | Poes |
| 10,473,935 B1 | 11/2019 | Gribetz et al. |
| 10,521,944 B2 | 12/2019 | Sareen et al. |
| 10,665,019 B2 | 5/2020 | Hildreth et al. |
| D888,071 S | 6/2020 | Wilberding |
| D900,123 S | 10/2020 | Lopes |
| 10,839,481 B1 | 11/2020 | Chen |
| D908,713 S | 1/2021 | Fremine et al. |
| D910,655 S | 2/2021 | Matthewman et al. |
| D910,660 S | 2/2021 | Chaturvedi et al. |
| 10,916,220 B2 | 2/2021 | Ngo |
| 10,976,804 B1 | 4/2021 | Atlas et al. |
| 10,987,573 B2 | 4/2021 | Nietfeld et al. |
| 10,990,240 B1 | 4/2021 | Ravasz et al. |
| 11,086,476 B2 | 8/2021 | Inch et al. |
| 11,276,215 B1 | 3/2022 | Grossinger et al. |
| 2004/0266506 A1 | 12/2004 | Herbrich et al. |
| 2005/0162419 A1* | 7/2005 | Kim ................ G06T 15/00 382/199 |
| 2008/0089587 A1 | 4/2008 | Kim et al. |
| 2008/0215994 A1 | 9/2008 | Harrison et al. |
| 2009/0044113 A1 | 2/2009 | Jones et al. |
| 2009/0251471 A1 | 10/2009 | Bokor et al. |
| 2009/0265642 A1 | 10/2009 | Carter et al. |
| 2010/0306716 A1 | 12/2010 | Perez |
| 2011/0148916 A1 | 6/2011 | Blattner |
| 2011/0267265 A1 | 11/2011 | Stinson |
| 2011/0302535 A1 | 12/2011 | Clerc et al. |
| 2012/0069168 A1 | 3/2012 | Huang et al. |
| 2012/0105473 A1 | 5/2012 | Bar-Zeev et al. |
| 2012/0113223 A1 | 5/2012 | Hilliges et al. |
| 2012/0117514 A1 | 5/2012 | Kim et al. |
| 2012/0143358 A1 | 6/2012 | Adams et al. |
| 2012/0206345 A1 | 8/2012 | Langridge |
| 2012/0275686 A1 | 11/2012 | Wilson et al. |
| 2012/0293544 A1 | 11/2012 | Miyamoto et al. |
| 2013/0038601 A1 | 2/2013 | Han et al. |
| 2013/0063345 A1 | 3/2013 | Maeda |
| 2013/0125066 A1 | 5/2013 | Klein et al. |
| 2013/0147793 A1 | 6/2013 | Jeon et al. |
| 2013/0265220 A1 | 10/2013 | Fleischmann et al. |
| 2014/0078176 A1 | 3/2014 | Kim et al. |
| 2014/0125598 A1 | 5/2014 | Cheng et al. |
| 2014/0191946 A1 | 7/2014 | Cho et al. |
| 2014/0236996 A1 | 8/2014 | Masuko et al. |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0123967 A1 | 5/2015 | Quinn et al. |
| 2015/0138099 A1 | 5/2015 | Major |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0261659 A1 | 9/2015 | Bader et al. |
| 2015/0293666 A1 | 10/2015 | Lee et al. |
| 2015/0358614 A1 | 12/2015 | Jin |
| 2015/0371441 A1 | 12/2015 | Shim |
| 2016/0035133 A1* | 2/2016 | Ye ................ G06T 15/60 345/419 |
| 2016/0062618 A1 | 3/2016 | Fagan et al. |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0178936 A1* | 6/2016 | Yang ................ G06T 19/20 351/246 |
| 2016/0314341 A1 | 10/2016 | Maranzana et al. |
| 2016/0378291 A1 | 12/2016 | Pokrzywka |
| 2017/0031503 A1 | 2/2017 | Rosenberg et al. |
| 2017/0060230 A1 | 3/2017 | Faaborg et al. |
| 2017/0061696 A1 | 3/2017 | Li et al. |
| 2017/0109936 A1 | 4/2017 | Powderly et al. |
| 2017/0139478 A1 | 5/2017 | Jeon et al. |
| 2017/0192513 A1 | 7/2017 | Karmon et al. |
| 2017/0236320 A1 | 8/2017 | Gribetz et al. |
| 2017/0237789 A1 | 8/2017 | Harner et al. |
| 2017/0262063 A1 | 9/2017 | Blénessy et al. |
| 2017/0270715 A1 | 9/2017 | Lindsay et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0316606 A1 | 11/2017 | Khalid et al. |
| 2017/0336951 A1 | 11/2017 | Palmaro |
| 2017/0364198 A1 | 12/2017 | Yoganandan et al. |
| 2018/0017815 A1* | 1/2018 | Chumbley ............ G02C 7/027 |
| 2018/0059901 A1 | 3/2018 | Gullicksen |
| 2018/0082454 A1 | 3/2018 | Sahu et al. |
| 2018/0096537 A1* | 4/2018 | Kornilov ................ G06V 20/20 |
| 2018/0107278 A1 | 4/2018 | Goel et al. |
| 2018/0113599 A1 | 4/2018 | Yin |
| 2018/0144556 A1 | 5/2018 | Champion et al. |
| 2018/0150993 A1 | 5/2018 | Newell et al. |
| 2018/0307303 A1 | 10/2018 | Powderly et al. |
| 2018/0322701 A1 | 11/2018 | Pahud et al. |
| 2018/0335925 A1 | 11/2018 | Hsiao et al. |
| 2018/0349690 A1 | 12/2018 | Rhee et al. |
| 2019/0050427 A1 | 2/2019 | Wiesel et al. |
| 2019/0065027 A1 | 2/2019 | Hauenstein et al. |
| 2019/0094981 A1 | 3/2019 | Bradski et al. |
| 2019/0102044 A1 | 4/2019 | Wang et al. |
| 2019/0107894 A1 | 4/2019 | Hebbalaguppe et al. |
| 2019/0130172 A1 | 5/2019 | Zhong et al. |
| 2019/0213792 A1 | 7/2019 | Jakubzak et al. |

(56) References Cited

U.S. PATENT DOCUMENTS

| | | |
|---|---|---|
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0286231 A1 | 9/2019 | Burns et al. |
| 2019/0310757 A1 | 10/2019 | Lee et al. |
| 2019/0313915 A1 | 10/2019 | Tzvieli et al. |
| 2019/0340419 A1 | 11/2019 | Milman et al. |
| 2019/0362562 A1 | 11/2019 | Benson |
| 2019/0377416 A1 | 12/2019 | Alexander |
| 2019/0385372 A1 | 12/2019 | Cartwright et al. |
| 2020/0050289 A1 | 2/2020 | Hardie-Bick et al. |
| 2020/0051527 A1 | 2/2020 | Ngo |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0110280 A1* | 4/2020 | Gamperling ......... A61B 3/0091 |
| 2020/0111260 A1 | 4/2020 | Osborn et al. |
| 2020/0211218 A1* | 7/2020 | Le Gallou ................ G06T 7/73 |
| 2020/0211512 A1 | 7/2020 | Sztuk et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0306640 A1 | 10/2020 | Kolen et al. |
| 2020/0312002 A1 | 10/2020 | Comploi et al. |
| 2020/0349635 A1* | 11/2020 | Ghoshal ............. G06Q 30/0643 |
| 2021/0007607 A1 | 1/2021 | Frank et al. |
| 2021/0011556 A1 | 1/2021 | Atlas et al. |
| 2021/0019911 A1 | 1/2021 | Kusakabe et al. |
| 2021/0088811 A1* | 3/2021 | Varady ................... G06V 10/44 |
| 2021/0090333 A1 | 3/2021 | Ravasz et al. |
| 2021/0124475 A1 | 4/2021 | Inch et al. |
| 2021/0134042 A1 | 5/2021 | Streuber et al. |
| 2021/0168324 A1 | 6/2021 | Ngo |
| 2021/0247846 A1 | 8/2021 | Shriram et al. |
| 2021/0296003 A1 | 9/2021 | Baeurele |
| 2021/0312658 A1 | 10/2021 | Aoki et al. |
| 2021/0383594 A1 | 12/2021 | Tang et al. |
| 2022/0021972 A1 | 1/2022 | Brimijoin, II et al. |
| 2022/0157036 A1 | 5/2022 | Chen et al. |
| 2022/0292774 A1* | 9/2022 | Yang ........................ G06N 3/09 |
| 2023/0021339 A1 | 1/2023 | Bosnak et al. |
| 2023/0252721 A1* | 8/2023 | Aleem ............... G06Q 30/0643 345/41 |

FOREIGN PATENT DOCUMENTS

| | | | | |
|---|---|---|---|---|
| WO | 03058518 A2 | 7/2003 | | |
| WO | 2016177290 A1 | 11/2016 | | |
| WO | WO-2017205903 A1 * | 12/2017 | ........... | G02C 13/003 |
| WO | WO-2019137215 A1 * | 7/2019 | ............. | G06F 3/012 |
| WO | 2023075771 A1 | 5/2023 | | |

OTHER PUBLICATIONS

Automatic Eyeglasses Removal from Face Images, Chenyu Wu et al., IEEE, 2004, pp. 322-336 (Year: 2004).*

A Method of Free-Space Point-of-Regard Estimation Based on 3D Eye Model and Stereo Vision, Zijing Wan et al., MDPI, 2018, pp. 1-17 (Year: 2018).*

Facial landmark detection by semi-supervised deep learning, Xin Tang et al., Elsevier, 2018, pp. 22-32 (Year: 2018).*

Chen Y., et al., "Object Modeling by Registration of Multiple Range Images," Proceedings of the 1991 IEEE International Conference on Robotics and Automation, Apr. 1991, pp. 2724-2729, Retrieved from the internet: URL: https://graphics.stanford.edu/courses/cs348a-17-winter/Handouts/chen-medioni-align-rob91.pdf.

Milborrow S., "Active Shape Models with Stasm," [Retrieved on Sep. 20, 2022], 3 pages, Retrieved from the Internet: URL: http://www.milbo.users.sonic.net/stasm/.

Milborrow S., et al., "Active Shape Models with SIFT Descriptors and Mars," Department of Electrical Engineering, 2014, 8 pages, Retrieved from the internet: URL: http://www.milbo.org/stasm-files/active-shape-models-with-sift-and-mars.pdf.

MRPT: "Ransac C++ Examples," 2014, 6 pages, Retrieved from the internet: URL: https://www.mrpt.org/tutorials/programming/maths-and-geometry/ransac-c-examples/.

Wikipedia: "Canny Edge Detector," [Retrieved on Sep. 20, 2022], 10 pages, Retrieved from the internet: URL: https://en.wikipedia.org/wiki/Canny_edge_detector.

Wikipedia: "Iterative Closest Point," [Retrieved on Sep. 20, 2022], 3 pages, Retrieved from the internet: URL: https://en.wikipedia.org/wiki/Iterative_closest_point.

Goldsmiths M, "Dancing into the Metaverse: A Real-Time virtual Dance Experience," Youtube [online], Nov. 14, 2021 [Retrieved on Sep. 5, 2023], 2 pages, Retrieved from the Internet: URL: https://www.youtube.com/watch?v=aNg-gqZNYRO.

Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

International Preliminary Report on Patentability for International Application No. PCT/US2020/052976, mailed May 5, 2022, 9 pages.

International Preliminary Report on Patentability for International Application No. PCT/US2021/064674, mailed Jul. 6, 2023, 12 pages.

International Preliminary Report on Patentability for International Application No. PCT/US2022/046196, mailed Apr. 25, 2024, 9 pages.

International Search Report and Written Opinion for International Application No. PCT/US2020/052976, mailed Dec. 11, 2020, 10 Pages.

International Search Report and Written Opinion for International Application No. PCT/US2021/064674, mailed Apr. 19, 2022, 13 pages.

International Search Report and Written Opinion for International Application No. PCT/US2022/046196, mailed Jan. 25, 2023, 11 pages.

International Search Report and Written Opinion for International Application No. PCT/US2023/020446, mailed Sep. 14, 2023, 14 pages.

Junghyun A., et al., "Motion Level-of-Detail: A Simplification Method on Crowd Scene," Proceedings of the 17th International Conference on Computer Animation and Social Agents [online], Jan. 23, 2013 [Retrieved on Sep. 7, 2023], 8 pages, Retrieved from the Internet: URL:https://citeseerx.ist.psu.edu/viewdoc/download;jsessionid=460ED1CB79EFA18B484B256E73A88FF3?.

Katz N., et al., "Extending Web Browsers with a Unity 3D-Based Virtual Worlds Viewer," IEEE Computer Society, Sep./Oct. 2011, vol. 15 (5), pp. 15-21.

Khan M.A., "Multiresolution Coding of Motion Capture Data for Real-Time Multimedia Applications," Multimedia Tools and Applications, Sep. 16, 2016, vol. 76, pp. 16683-16698.

Mayer S., et aL, "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Moran F., et al., "Adaptive 3D Content for Multi-Platform On-Line Games," 2007 International Conference on Cyberworlds (CW'07), Oct. 24, 2007, pp. 194-201.

Nextworldvr, "Realtime Motion Capture 3ds Max w/ Kinect," Youtube [online], Mar. 14, 2017 [Retrieved on Sep. 5, 2023], 2 pages, Retrieved from the Internet: URL:https://www.youtube.com/watch?v=vOYWYEOwRGO.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Qiao X., et al., "Web AR: A Promising Future for Mobile Augmented Reality—State of the Art. Challenges, and Insights," Proceedings of the IEEE, Apr. 2019, vol. 107 (4), pp. 651-666.

(56) References Cited

OTHER PUBLICATIONS

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.

Savoye Y., et al., "Multi-Layer Level of Detail for Character Animation," Workshop in Virtual Reality Interactions and Physical Simulation VRIPHYS (2008) [online], Nov. 18, 2008 [Retrieved on Sep. 7, 2023], 10 pages, Retrieved from the Internet: URL: http://www.animlife.com/publications/vriphys08.pdf.

Schweigert R., et aL., "EyePointing: A Gaze-Based Selection Technique," Proceedings of Mensch and Computer, Hamburg, Germany, Sep. 8-11, 2019, pp. 719-723.

Srinivasa R.R., "Augmented Reality Adaptive Web Content," 13th IEEE Annual Consumer Communications Networking Conference (CCNC), 2016, pp. 1-4.

Trademark Application Serial No. 73289805, filed Dec. 15, 1980, 1 page.

Trademark Application Serial No. 73560027, filed Sep. 25, 1985, 1 page.

Trademark Application Serial No. 74155000, filed Apr. 8, 1991, 1 page.

Trademark Application Serial No. 76036844, filed Apr. 28, 2000, 1 page.

Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.

Whitton M., et al., "Integrating Real and Virtual Objects in Virtual Environments," Aug. 24, 2007, Retrieved from http://web.archive.org/web/20070824035829/http://www.cs.unc.edu/~whitton/ExtendedCV/Papers/2005-HCII-Whitton-MixedEnvs.pdf, on May 3, 2017, 10 pages.

European Search Report for European Patent Application No. 24162068.1, dated Aug. 20, 2024, 8 pages.

International Preliminary Report on Patentability for International Application No. PCT/US2023/020446, mailed Nov. 7, 2024, 12 pages.

\* cited by examiner

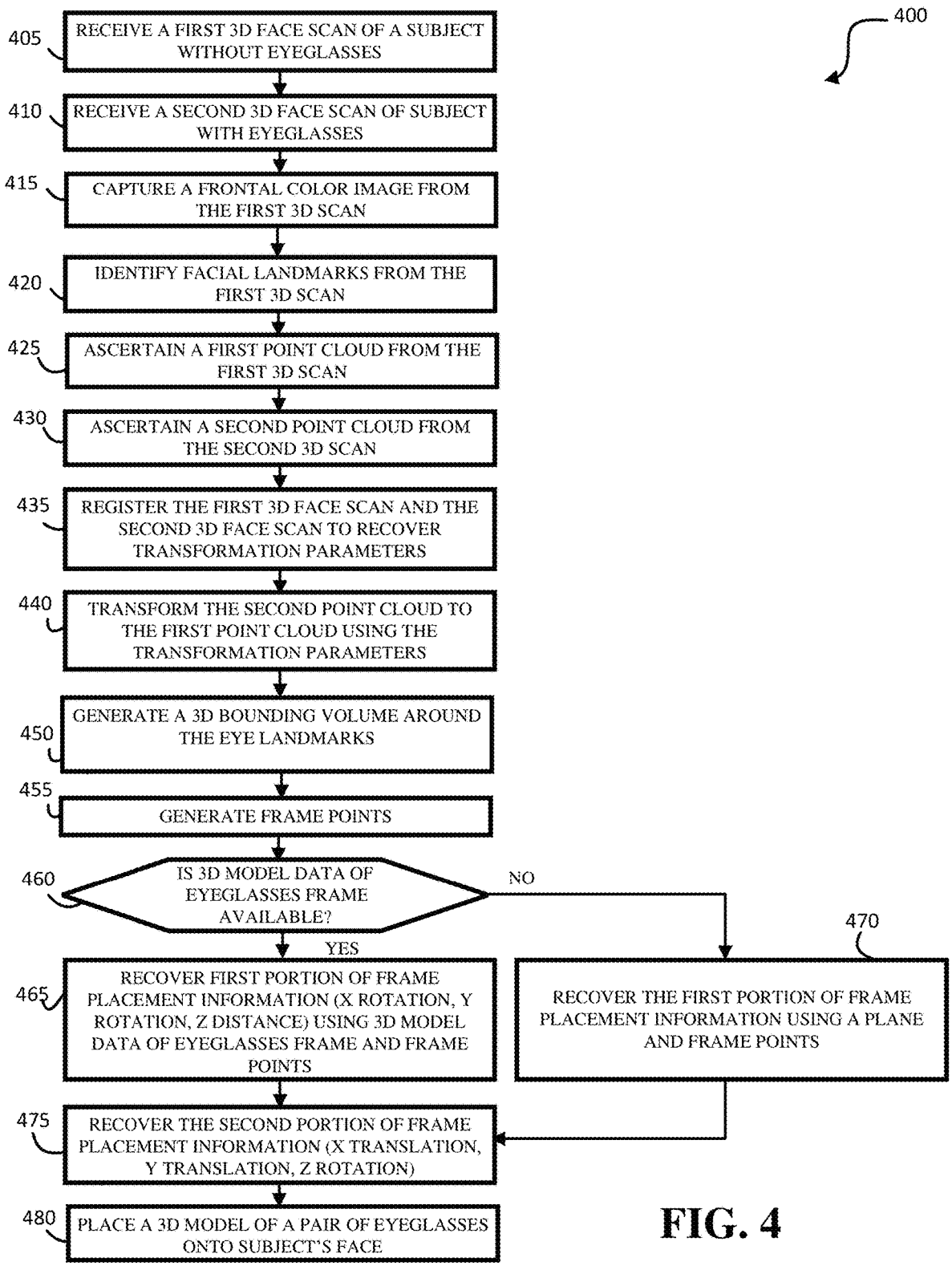

SYSTEM AND METHOD FOR POSITIONING A 3D EYEGLASSES MODEL

CROSS-REFERENCE TO RELATED APPLICATION

The present Application claims the benefit of U.S. Provisional Application No. 63/158,304, entitled "3D Scanning of Faces with Eyeglasses" filed Mar. 8, 2021. U.S. Provisional Application No. 63/158,304 is expressly incorporated herein by reference in its entirety.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

The virtual placement of a pair of eyeglasses on the face of a user allows the user to visualize the manner in which the pair of eyeglasses appear on the face of the user. Use of such a virtual "try-on" system may convince the user to make a purchase of the pair of eyeglasses after viewing the eyeglasses on the face of the user. A realistic simulation of the eyeglasses on the face of the user necessitates the accurate placement of the eyeglasses on a three-dimensional face model of the user. The placement information generally includes translation and rotation information related to the eyeglasses frontal frame relative to the face model of the user. The placement information is exceedingly difficult to obtain with physical measurement because of the proximity of the eyeglasses to the face of the user. Three-dimensional face scanning provides a simple, fast, and accurate way to simulate the application a new pair of eyeglasses on the user's face.

BRIEF DESCRIPTION OF THE DRAWINGS

FIG. 4 is a flow diagram illustrating a method for placing an eyeglasses model on the face of the subject of FIG. 1 in accordance with some embodiments.

DETAILED DESCRIPTION

Figure 1:
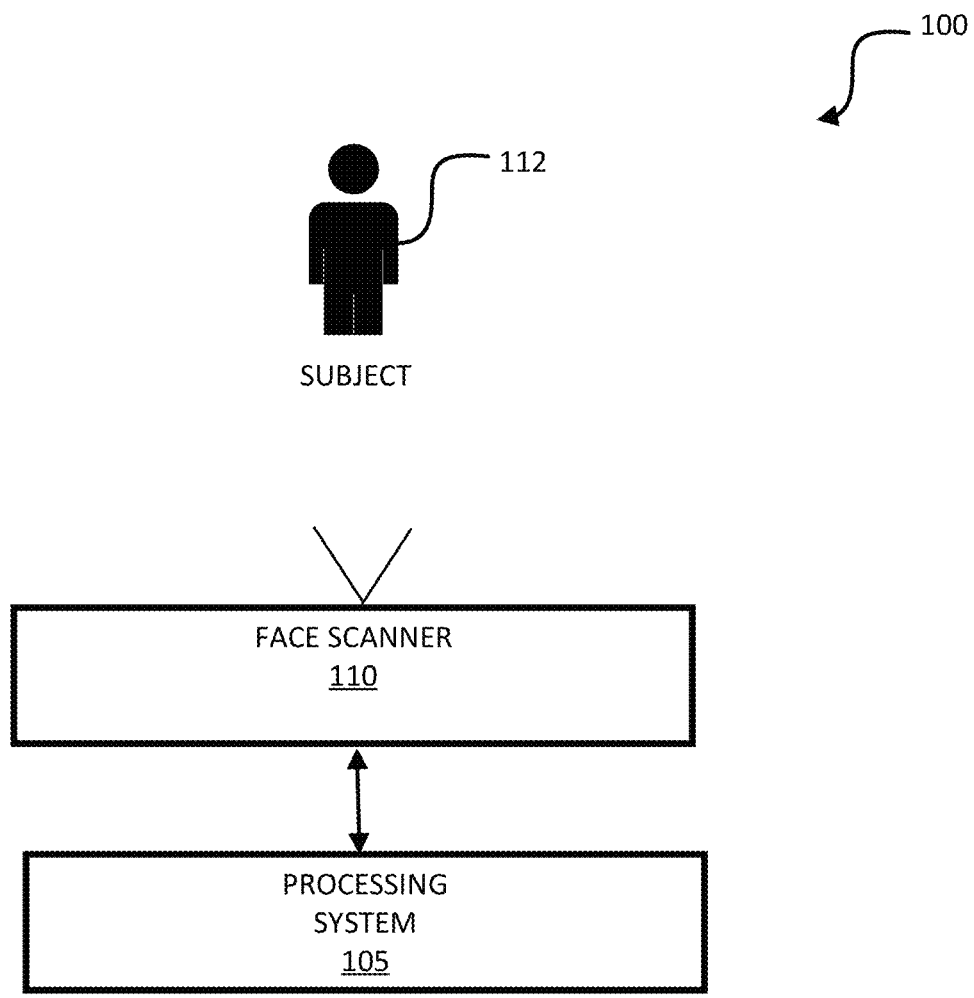
FIG. 1 illustrates an example embodiment of a system used to place an eyeglasses model on a face of a subject in accordance with one or more embodiments described herein.
Figure 3A:
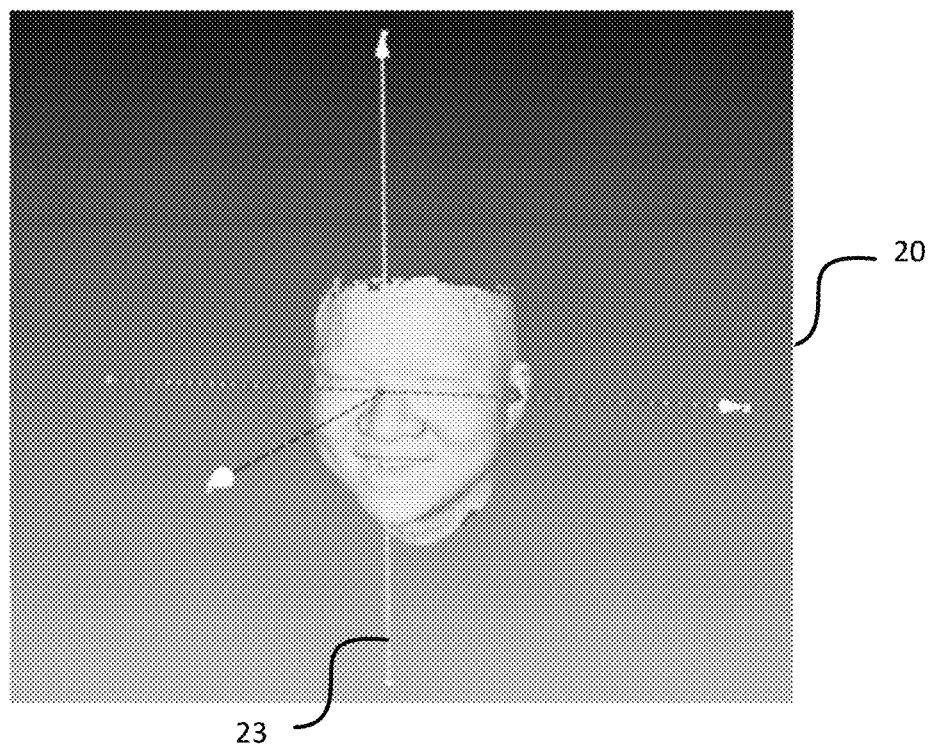
FIG. 3A illustrates a face model without eyeglasses utilized to place an eyeglasses model on the face of the subject of FIG. 1 in accordance with some embodiments.
Figure 3B:
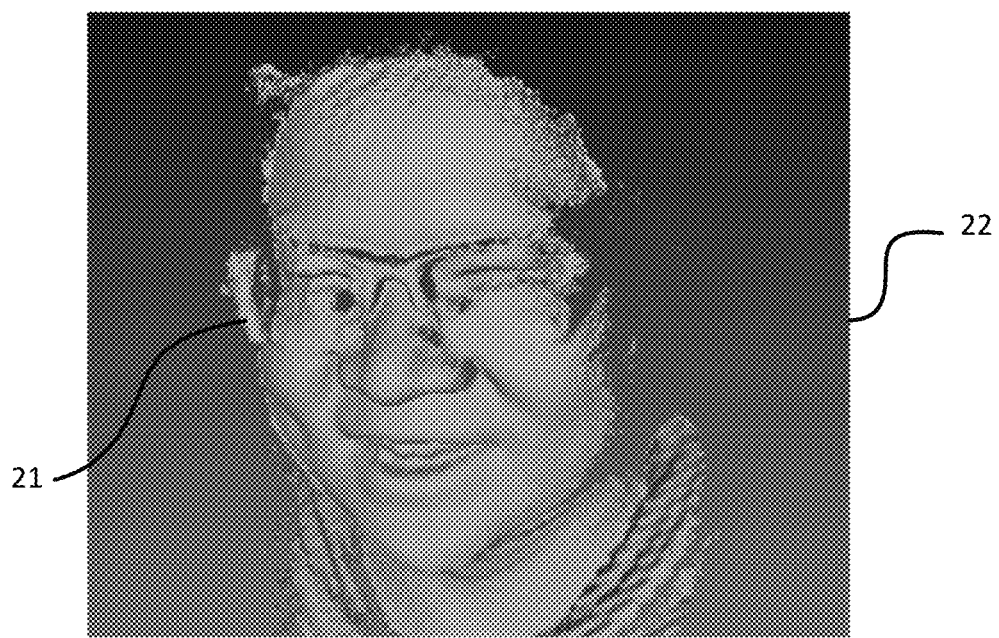
FIG. 3B illustrates a face model with eyeglasses utilized to place an eyeglasses model on the face of the subject of FIG. 1 in accordance with some embodiments.

FIG. 1 illustrates a system 100 for placing a 3D eyeglasses model in accordance with some embodiments. In some embodiments, the system 100 includes a face scanner 110 and a processing system 105 that are utilized by a subject 112 to place a 3D eyeglasses model on a 3D face model of the subject 112. In some embodiments, subject 112 or user refers to a person whose face is scanned without a pair of eyeglasses (as depicted in FIG. 3A) and with a pair of eyeglasses (as depicted in FIG. 3B) using the face scanner 110. In some embodiments, the 3D face scanner or face scanner 110 refers to a scanning device or video camera that circles around a head of the subject 112 to capture the head from different directions and creates a 3D model that includes points, polygons (connectivity of the points), and a color texture map of the surface. An example of such scanner is a BELLUS 3D Face Camera Pro. In some embodiments, the face models captured by the face scanner 110 are generally saved in a 3D file format such as .STL, .PLY or .OBJ. In some embodiments, a 3D face scanner may be a special purpose camera that is tethered to a processing system or processing device or it may be a single device that performs both facial capture and 3D processing. An example of such a single device is an APPLE IPHONE X. Importantly, a 3D face scanner captures depth or range information in addition to color information in order to enable generation of a 3D face model with color. Typically, both color and depth data are provided as two-dimensional frames, or arrays, of pixels. Typically, color data is in the RGB color space. Depth information may be characterized in a variety of ways, such as millimeters of distance from the camera to an object. Depth data may also indicate whether a pixel is closer than a minimum range value or farther than a maximum range value. Face scanner 110 may be, for example, a face scanner on a commercial mobile device such as an IPHONE from APPLE INC. configured to perform image capture, 3D model generation, and eye model generation processing described herein. In some embodiments, processing system 105 is a computer system configured to process the images scanned by face scanner 110 to place an eyeglasses model on the face of the subject 112.

In some embodiments, in the system 100, face scanner 110 captures or scans a face of the subject 112 with eyeglasses and without eyeglasses and generates a 3D model of the face of the subject 112 without the eyeglasses and a 3D model of the face of the subject 112 with the eyeglasses. In system 10, processing of the method for placing a 3D model of a pair of eyeglasses onto the face of the subject 112, described in greater detail with reference to the FIGS. 2-5, is performed by a processing system 105. In system 100, the face scanner 110 communicates the scanned images to processing system 105, which performs the processing of the placement of a 3D model of a pair of eyeglasses onto the face of the subject 112.

Other embodiments that allocate features and processing amongst face scanner 110 and processing system 105 may be employed without departing from the spirit and scope of the method for placing the 3D eyeglasses model onto the face of the subject 112 as described herein. For example, processing steps described with reference to the FIGS. 1-5 described herein may be allocated freely among the devices, e.g., face scanner 110 and processing system 105. Further, face scanner 110 and processing system 105 may serve as the same scanning device in certain embodiments.

Figure 2A:
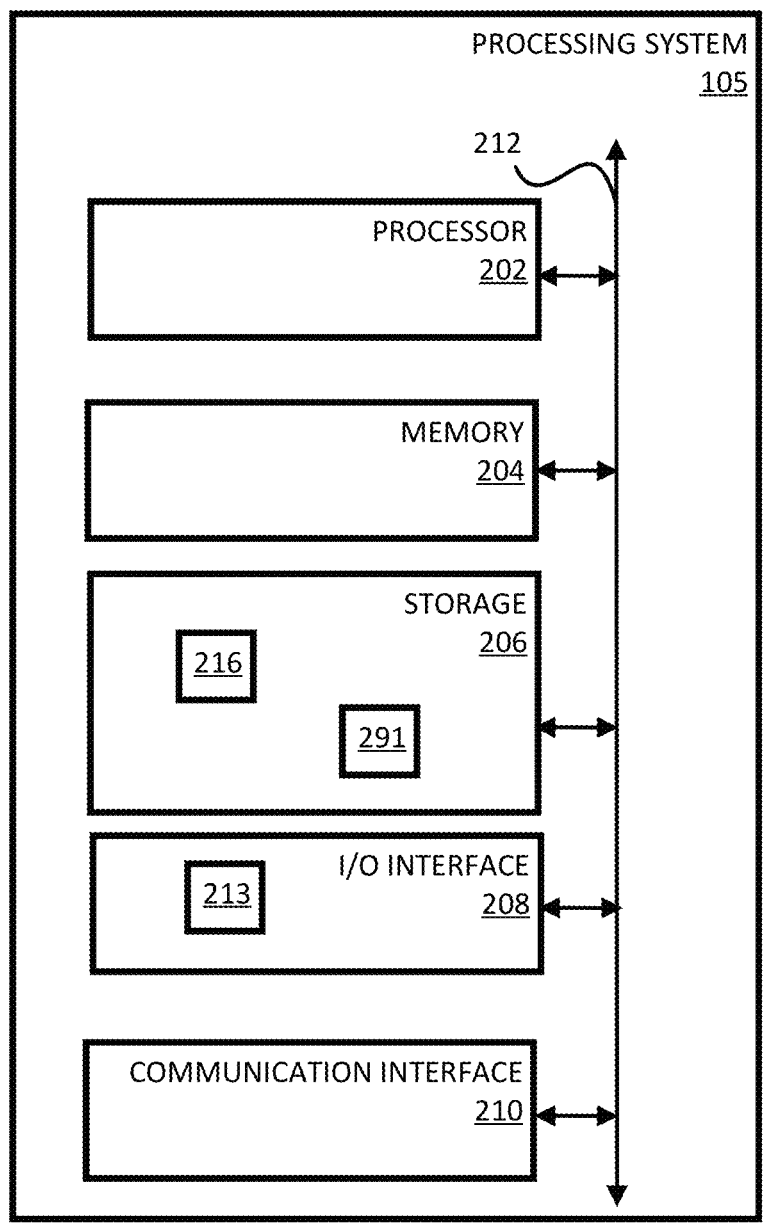
FIG. 2A illustrates a processing system used to place an eyeglasses model on the face of the subject of FIG. 1 in accordance with some embodiments.

FIG. 2A illustrates an example processing system 105 that is used to place an eyeglasses model on the face of the subject 112 of FIG. 1 in accordance with some embodiments. In some embodiments, one or more processing systems 105 may perform one or more steps of one or more methods described or illustrated herein. In particular embodiments, one or more processing systems 105 provide functionality described or illustrated herein. In particular embodiments, software running on one or more processing systems 105 performs one or more steps of one or more methods described or illustrated herein or provides functionality described or illustrated herein. Particular embodiments include one or more portions of one or more processing systems 105. Herein, reference to a computer system may encompass a computing device, and vice versa, where appropriate. Moreover, reference to a computer system may encompass one or more computer systems, where appropriate.

This disclosure contemplates any suitable number of processing systems 105. This disclosure contemplates processing system 105 taking any suitable physical form. As example and not by way of limitation, processing system 105 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, processing system 105 may include one or more processing systems 105; be unitary or distributed; span multiple locations; span multiple machines; span multiple data centers; or reside in a cloud, which may include one or more cloud components in one or more networks. Where appropriate, one or more processing systems 105 may perform without substantial spatial or temporal limitation one or more steps of one or more methods described or illustrated herein. As an example and not by way of limitation, one or more processing systems 105 may perform in real time or in batch mode one or more steps of one or more methods described or illustrated herein. One or more processing systems 105 may perform at different times or at different locations one or more steps of one or more methods described or illustrated herein, where appropriate.

In some embodiments, processing system 105 includes a processor 202, memory 204, storage 206, an input/output (I/O)) interface 208, a communication interface 210, and a bus 212. In some embodiments, the processing system described herein may be considered a computer system. Although this disclosure describes and illustrates a particular computer system having a particular number of particular components in a particular arrangement, this disclosure contemplates any suitable computer system having any suitable number of any suitable components in any suitable arrangement.

In some embodiments, processor 202 includes hardware for executing instructions, such as those making up a computer program. As an example and not by way of limitation, to execute instructions, processor 202 may retrieve (or fetch) the instructions from an internal register, an internal cache, memory 204, or storage 206, decode and execute them; and then write one or more results to an internal register, an internal cache, memory 204, or storage 206. In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 206, and the instruction caches may speed up retrieval of those instructions by processor 202. Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In particular embodiments, processor 202 may include one or more internal registers for data, instructions, or addresses. This disclosure contemplates processor 202 including any suitable number of any suitable internal registers, where appropriate. Where appropriate, processor 202 may include one or more arithmetic logic units (ALUs); be a multi-core processor, or include one or more processors 202. Although this disclosure describes and illustrates a particular processor, this disclosure contemplates any suitable processor.

In some embodiments, memory 204 includes main memory for storing instructions for processor 202 to execute or data for processor 202 to operate on. As an example and not by way of limitation, processing system 105 may load instructions from storage 206 or another source (such as, for example, another processing system 105) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses, as described below. In particular embodiments, one or more memory management units (MMUs) reside between processor 202 and memory 204 and facilitate accesses to memory 204 requested by processor 202. In particular embodiments, memory 204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 204 may include one or more memories 204, where appropriate. Although this disclosure describes and illustrates particular memory, this disclosure contemplates any suitable memory.

In some embodiments, storage 206 includes mass storage for data or instructions. In some embodiments, storage 206 includes an eyeglasses model placement system 216 (described further in detail with respect to FIG. 2B and FIG. 4). In some embodiments, eyeglasses model placement system 216 is software configured to place a 3D eyeglasses model 79 on a face of a subject as depicted by example in FIG. 5H. As an example and not by way of limitation, storage 206 may include a hard disk drive (HDD), a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to processing system 105, where appropriate. In particular embodiments, storage 206 is non-volatile, solid-state memory. In particular embodiments, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Where appropriate, storage 206 may include one or more storages 206. Although this disclosure describes and illustrates particular storage, this disclosure contemplates any suitable storage.

In some embodiments, I/O interface 208 includes hardware, software, or both, providing one or more interfaces for communication between processing system 105 and one or more I/O devices. Processing system 105 may include one or more of these I/O devices, where appropriate. In some embodiments, V/O interface 208 may include a camera 213. In some embodiments, the camera 213 may be configured to operate as a face scanner, e.g., a three-dimensional face scanner. One or more of these I/O devices may enable communication between a person and processing system 105. As an example and not by way of limitation, an I/O device may include a keyboard, keypad, microphone, monitor, mouse, printer, scanner, speaker, still camera, stylus, tablet, touch screen, trackball, video camera, another suitable I/O) device or a combination of two or more of these. An I/O device may include one or more sensors. This disclosure contemplates any suitable I/O devices and any suitable I/O interfaces 208 for them. Where appropriate, VO interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In some embodiments, communication interface 210 includes hardware, software, or both providing one or more interfaces for communication (such as, for example, packet-based communication) between processing system 105 and one or more other processing systems 105 or one or more networks. As an example and not by way of limitation, communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. As an example and not by way of limitation, processing system 105 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, processing system 105 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Processing system 105 may include any suitable communication interface 210 for any of these networks, where appropriate. Communication interface 210 may include one or more communication interfaces 210, where appropriate. Although this disclosure describes and illustrates a particular communication interface, this disclosure contemplates any suitable communication interface.

In some embodiments, bus 212 includes hardware, software, or both coupling components of processing system 105 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 212 may include one or more buses 112, where appropriate. Although this disclosure describes and illustrates a particular bus, this disclosure contemplates any suitable bus or interconnect.

As described herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 2B:
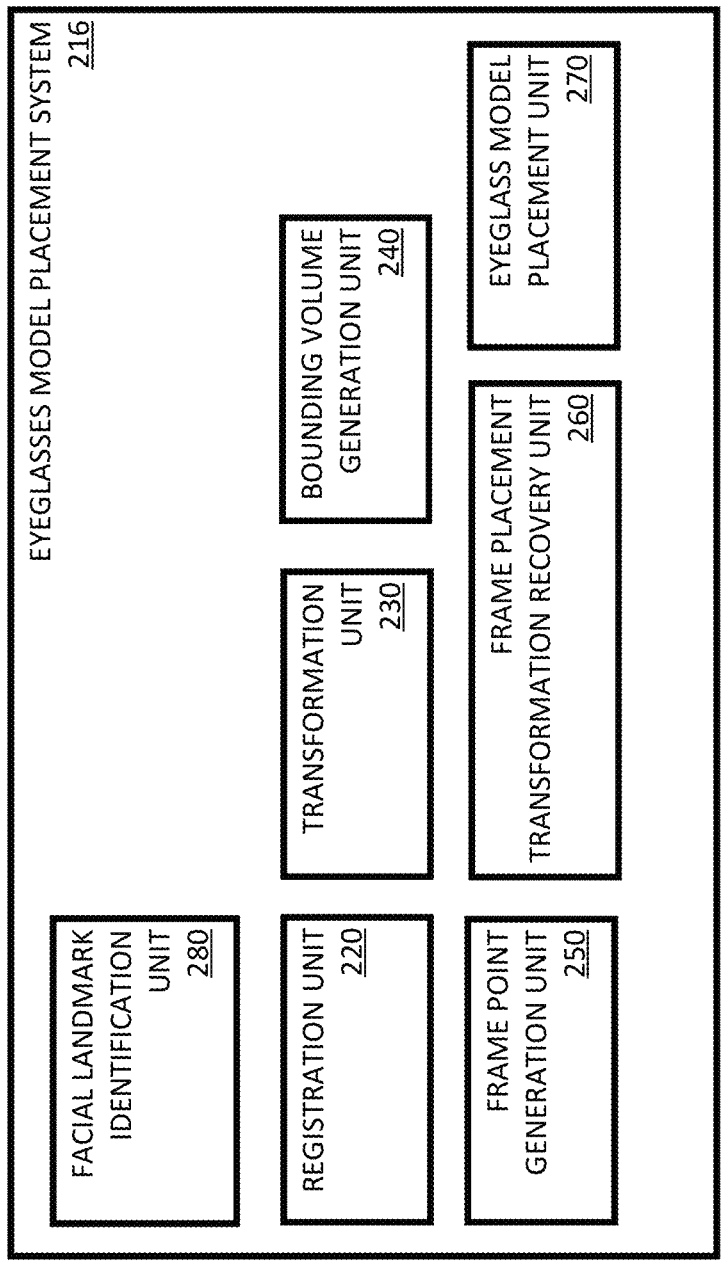
FIG. 2B illustrates an eyeglasses model placement system in accordance with some embodiments.

FIG. 2B illustrates an eyeglasses model placement system 216 of the system 100 of FIG. 1 utilized to place an eyeglasses model on the face of a subject in accordance with some embodiments. In some embodiments, the eyeglasses model placement system 216 includes a facial landmark identification unit 280, a registration unit 220, a transformation unit 230, a bounding volume generation unit 240, a frame point generation unit 250, and a frame placement transformation recovery unit 260, and an eyeglasses model placement unit 270. In some embodiments, the registration unit 220, the facial landmark identification unit 280, the transformation unit 230, the bounding volume generation unit 240, the frame point generation unit 250, and the frame placement transformation recovery unit 260, and the eyeglasses model placement unit 270 are software components configured to place an eyeglasses model on the face of the subject of FIG. 1 as described further below with reference to the method of FIG. 4.

The method described herein with reference to FIG. 4 processes two 3D models (e.g., digital images) captured by face scanner 110. FIG. 3A and FIG. 3B illustrate examples of the two 3D models used by the method. The two models are as follows with reference to FIG. 3A and FIG. 3B.

FIG. 3A illustrates an example of a without-eyeglasses face scan 20 produced by face scanner 110, which is a 3D face scan of a subject 112 without eyeglasses. In some embodiments, the face of the subject 112 has, for example, a regular expression, however, a particular facial expression is not required of the subject 112 in the 3D face scan.

FIG. 3B illustrates an example with-eyeglasses face scan 22 produced by face scanner 110, which is a 3D face scan of the subject 112 with eyeglasses on the face of the subject 112. In some embodiments, the expression of the face of the subject 112 of the with-eyeglasses face scan 22 is similar to the expression of the face of the subject 112 in the without-eyeglasses face scan 20.

FIG. 4 is a flow diagram illustrating a method 400 for placing a 3D eyeglasses model 79 on a face of a subject in accordance with some embodiments. In some embodiments, the method 400 includes generating a transformation that is used to place the 3D eyeglasses model 79 on the face of the subject 112 of FIG. 1. In some embodiments, the method is described with reference to FIG. 1-FIG. 3B and FIG. 5A-FIG. 5I. In some embodiments, the method, process steps, or stages illustrated in the figures may be implemented as an independent routine or process, or as part of a larger routine or process. Note that each process step or stage depicted may be implemented as an apparatus that includes a processor executing a set of instructions, a method, or a system, among other embodiments.

In some embodiments, at block 405, a first 3D face scan of the subject 112, e.g., without-eyeglasses face scan 20, is received by the eyeglasses model placement system 216 from face scanner 110. In some embodiments, as stated previously, the without-eyeglasses face scan 20 is a 3D facial scan of the face of subject 112 without wearing a pair of eyeglasses. FIG. 3A illustrates an example of the without-eyeglasses face scan 20 that is used to place the 3D eyeglasses model 79 of a pair of eyeglasses on the face of subject 112 using the method 400 in accordance with some embodiments.

In some embodiments, at block 410, a second 3D face scan of the subject 112, e.g., with-eyeglasses face scan 22, is received by the eyeglasses model placement system 216 from face scanner 110. In some embodiments, as stated previously, the with-eyeglasses face scan 22 is a 3D facial scan of the face of subject 112 wearing a pair of eyeglasses 21. In some embodiments, each of the face scans (e.g, without-eyeglasses face scan 20 and with-eyeglasses face scan 22) is represented as a 3D model. Each scan or 3D model may be a data structure stored on a disk or in a computer memory, or more typically, each scan is received in a file in a standard 3D file format such as STL, PLY or .OBJ Thus, the term scan as used with, for example, the without-eyeglasses face scan 20 and with-eyeglasses face scan 22, refers to a 3D model that is processed by method 400. FIG. 3B illustrates an example of the with-eyeglasses face scan 22 that is used to place the 3D eyeglasses model 79 of a pair of eyeglasses on the face of subject 112 using the method 400 in accordance with some embodiments.

In some embodiments, without loss of generality and as illustrated in FIG. 3A, a coordinate system 23 is utilized in the 3D face scan that has an origin between the two pupil points of the eyes of the face, with a Y-axis pointing to the top of the head of the subject 112, a Z-axis pointing to the front away from the face of the subject 112, and an X-axis pointing to the left ear direction of the subject 112. As stated previously, FIG. 3B illustrates an example coordinate system 23 that is used to place the 3D eyeglasses model 79 of a pair of eyeglasses on the face of subject 112 using the method 400 in accordance with some embodiments.

Figure 5A:
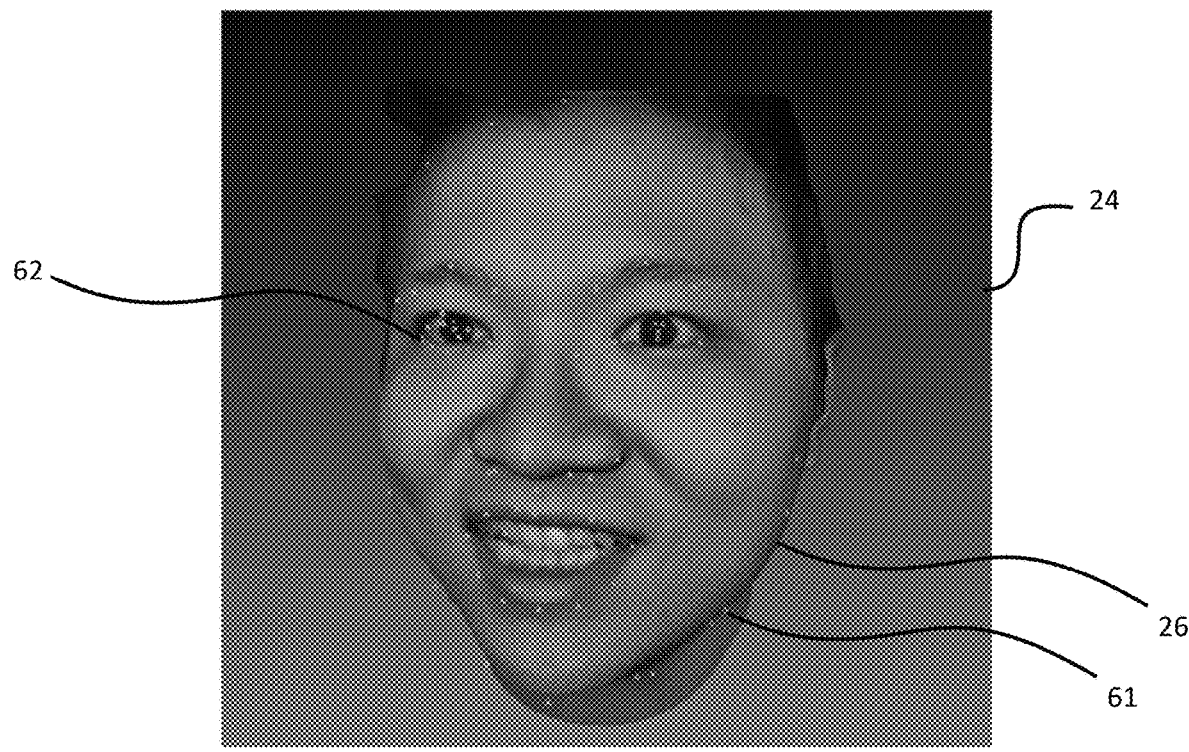
FIG. 5A illustrates a frontal image and facial landmarks captured in a three-dimensional face scan that is utilized to place an eyeglasses model on the face of the subject of FIG. 1 in accordance with some embodiments.

In some embodiments, at block 415, a frontal image 24 of the face of the subject 112 is captured using the without-eyeglasses face scan 20. In some embodiments, the frontal image 24 is a two-dimensional (2D) color image of subject 112 that, as described herein, is used to generate facial landmarks 61 of the subject 112. FIG. 5A illustrates an example frontal image 24 that is used to identify facial landmarks 61 on the face of subject 112 and place the 3D eyeglasses model 79 of a pair of eyeglasses on the face of subject 112 using the method 400 in accordance with some embodiments.

In some embodiments, at block 420, facial landmarks 61 are identified using the frontal image 24. In some embodiments, a facial landmark identification unit 280 of FIG. 2B is configured to identify the facial landmarks 61 illustrated in FIG. 5A. In some embodiments, the facial landmarks 61 are subsets of points that indicate the facial features of subject 112. In some embodiments, one subset of points indicates the eyebrows of the subject 112, another subset of points indicates the eyes of the subject 112, another subset of points indicates a nose of the subject 112, and another subset of points indicates the mouth of the subject 112. For example, in some embodiments, only the subset of points indicative of the eyes of the subject 112 (e.g., eye landmarks 62) are utilized to place the 3D eyeglasses model 79 on the face of subject 112.

In some embodiments, an automatic facial landmark detector, such as STASM, is used to identify and detect facial landmarks from the frontal image 24. STASM is a programming library for finding features in faces based on the Active Shape Model. The Active Shape Model is described in an article entitled "Active Shape Models with SIFT Descriptors and Mars", which is available on the Worldwide Web at http://www.milbo.org/stasm-files/active-shape-models-with-sift-and-mars.pdf. Information about the STASM programming library can be found on the Worldwide Web at http://www.milbo.users.sonic.net/stasm/. STASM operates on 2D images that show the front views of faces. Thus, a 2D frontal view of without-eyeglasses face scan 20 is rendered and used with the STASM programming library. This results in a set of 2D points that indicate the outline of major facial features being identified for each respective image. FIG. 5A illustrates example eye landmarks 62 that are used to place the 3D eyeglasses model 79 of a pair of eyeglasses on the face of subject 112 using the method 400 in accordance with some embodiments.

In some embodiments, at block 425, eyeglasses model placement system 216 ascertains point cloud data (e.g., point cloud 1 or a first point cloud) associated with without-eyeglasses face scan 20 from face scanner 110. In some embodiments, a point cloud is a list of points that form a mesh of the face for each 3D face scan. For example, without-eyeglasses face scan 20 includes a first list of points, e.g., the first point cloud (point cloud 1), that form a mesh of the face of the subject 112 of the first 3D face scan, and with-eyeglasses face scan 22 includes a second list of points, e.g., a second point cloud (point cloud 2), that form a mesh of the face of the subject 112 of the second face scan. In some embodiments, at block 430, eyeglasses model placement system 216 ascertains point cloud data (e.g., point cloud 2 or a second point cloud) associated with with-eyeglasses face scan 22 from face scanner 110. In some embodiments, the first point cloud and the second point cloud are used to recover translation parameters that are used to place the 3D eyeglasses model 79 on the face of subject 112, as discussed further below with respect to, for example, block 435 and block 440.

In some embodiments, at block 435, registration unit 220 registers the without-eyeglasses face scan 20 (e.g., point cloud 1) with the with-eyeglasses face scan 22 (e.g., point cloud 2). That is, the without-eyeglasses face scan 20 and the with-eyeglasses face scan 22 are registered (i.e., placed in a single image space or 3D coordinate system) to recover three-dimensional transformation (i.e. translation and rotational) parameters to align point cloud 2 to point cloud 1. In some embodiments, the without-eyeglasses face scan 20 and the with-eyeglasses scan 22 are registered using a method such as, for example, the Iterative Closest Point (ICP) Method. In some embodiments, an ICP Method, which is a well-known algorithm to find a relative transformation, i.e., rotation and translation, that aligns or "registers" two meshes, i.e., 3D models, in 3D space. An article that describes ICP is Chen, Yang: Gerard Medioni (1991). "Object modelling by registration of multiple range images". Image Vision Comput. Newton, Mass, USA. Butterworth-Heinemann: pp. 145-155. ICP requires that the two meshes be roughly aligned and it then iteratively finds a best transformation that minimizes some objective measurement such as the mean distance between the vertices. ICP converges faster when the two sets are already closely aligned and the data have substantial overlaps. ICP then proceeds to randomly select some number of matching points between the models based on distance. ICP then computes a transformation (X, Y, Z translation and rotation) from one model (with-eyeglasses face scan 22) to another (without-eyeglasses face scan 20) that minimizes the distance error of all the matching points. The process is repeated until the distance error is within a preset threshold. In some embodiments, the result is a transformation or transformation matrix that best aligns with-eyeglasses face scan 22 to without-eyeglasses face scan 20. Thus, in some embodiments, the ICP Method is used to recover the three-dimensional translation and rotational parameters to align point cloud 2 to point cloud 1. In some embodiments, registration unit 220 uses the ICP method to recover the three-dimensional translation and rotation parameters to align point cloud 2 to point cloud 1. In some embodiments, registration unit 220 provides the recovered transformation to transformation unit 230 for further processing.

Figure 5B:
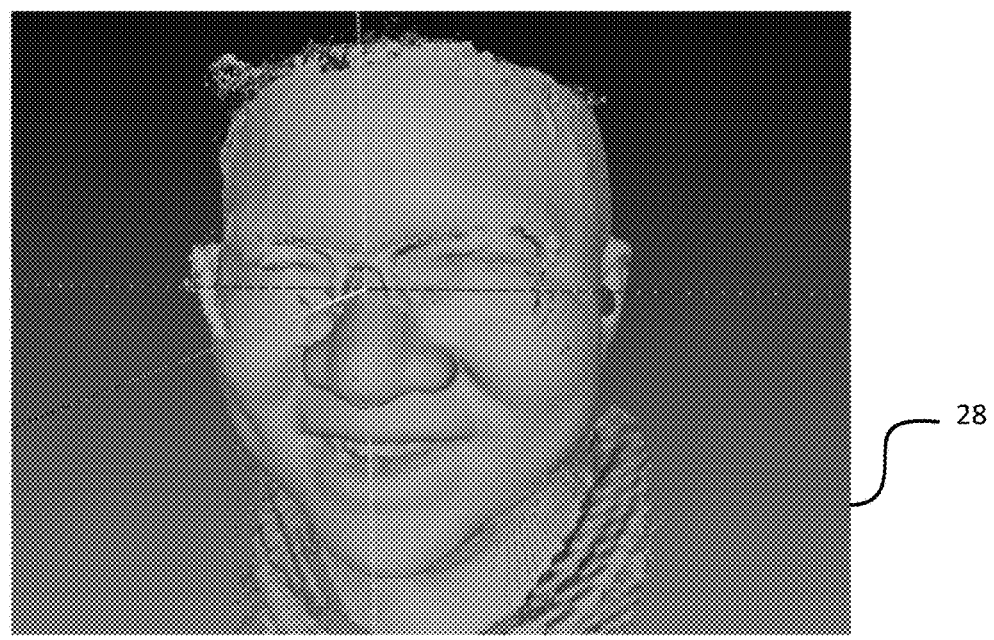
FIG. 5B illustrates a face model with and without eyeglasses registered in a common coordinate system utilized to place an eyeglasses model on the face of the subject of FIG. 1 in accordance with some embodiments.

In some embodiments, at block 440, transformation unit 230 transforms the second point cloud to point the first point cloud with the recovered transformation such that the second point cloud is in the same coordinate system as first point cloud. In some embodiments, as stated previously, the second point cloud is transformed to the first point cloud with the recovered transformation (e.g., the recovered translation and rotation parameters). FIG. 5B illustrates an example of the transformation of the second point cloud to the first point cloud that is used to place the 3D eyeglasses model 79 of a pair of eyeglasses on the face of subject 112 using the method 400 in accordance with some embodiments.

Figure 5C:
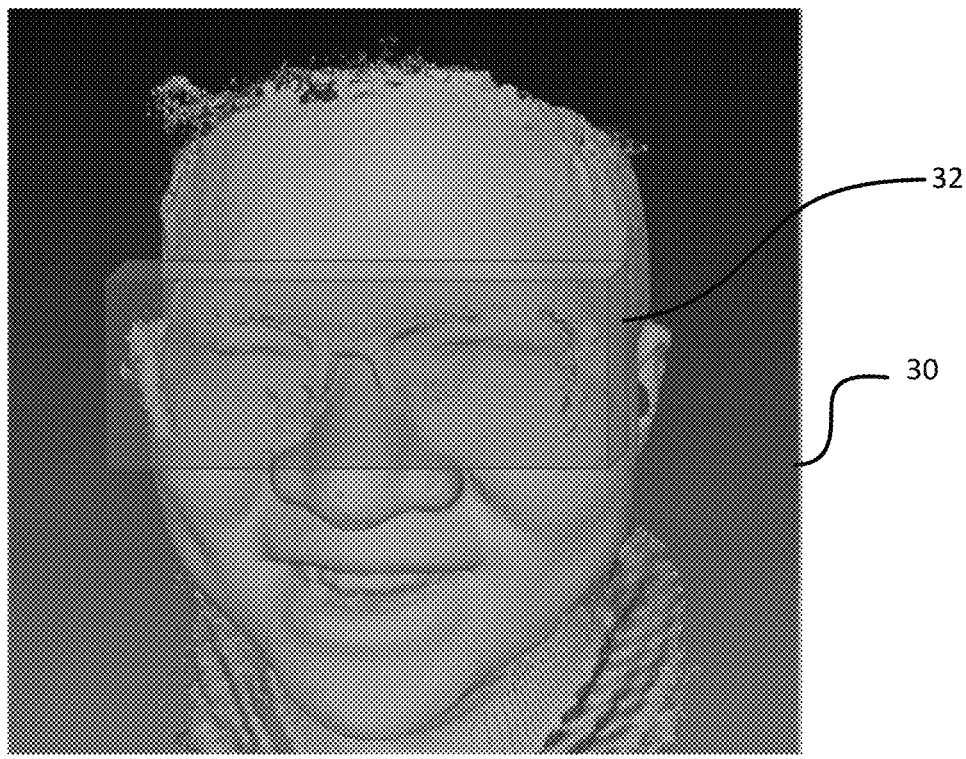
FIG. 5C illustrates a bounding volume utilized to place an eyeglasses model on the face of the subject of FIG. 1 in accordance with some embodiments.
Figure 5D:
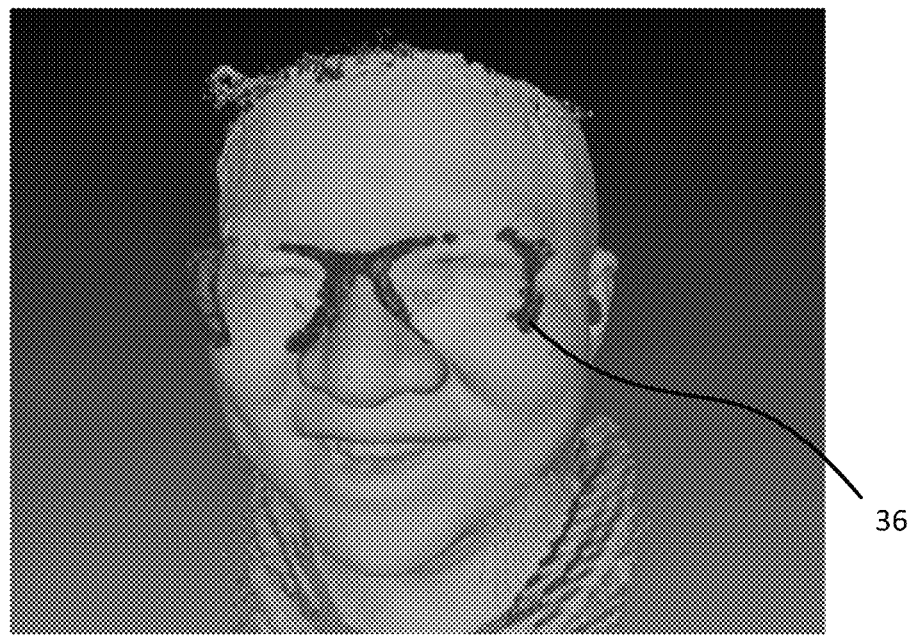
FIG. 5D illustrates frame points utilized to place an eyeglasses model on the face of the subject of FIG. 1 in accordance with some embodiments.

In some embodiments, at block 450, bounding volume generation unit 240 uses the eye landmarks 62 to generate a 3D bounding volume 32. In some embodiments, the 3D bounding volume 32 generated by the bounding volume generation unit 240 encompasses the eye landmarks 62 and serves as an eyeglasses frame region. In some embodiments, the 3D bounding volume is a rectangular box or frame region that is configured to utilize the eye landmarks 62 to provide an estimated position of the eyeglasses. In some embodiments, the size of the 3D bounding volume 32 is selected by the bounding volume generation unit 240 to be a size of a typical pair of eyeglasses (e.g., a frame width of 132 mm, a frame height of 39 mm, and a frame depth 10 mm). FIG. 5C illustrates an example 3D bounding volume 32 generated by the eyeglasses model placement system 216 in accordance with some embodiments. As can be seen from FIG. 5C, the 3D bounding volume 32 has been generated around the eye landmarks 62 identified using the facial landmark identification techniques of facial landmark identification unit 280.

In some embodiments, at block 455, frame point generation unit 250 generates frame points 36 using the 3D bounding volume 32 generated at block 450. In some embodiments, frame points 36 are points associated with eyeglasses frame that are used to recover a first portion of frame placement information. Frame placement information is placement information that is used to position the eyeglass frames in the appropriate location relative to the face of the subject 112. Frame placement information includes an X rotation of the frontal frame of the eyeglasses, a Y rotation of the frontal frame of the eyeglasses, a Z distance of the frontal frame of the eyeglasses, an X translation of the frontal frame of the eyeglasses frame, a Y translation of the frontal frame of the eyeglasses, and a Z rotation of the frontal frame of the eyeglasses. In some embodiments, the first portion of the frame placement information includes the X rotation of the frontal frame of the eyeglasses, the Y rotation of the frontal frame of the eyeglasses, and the Z distance of the frontal frame of the eyeglasses. In some embodiments, a second portion of the frame placement information includes the X translation of the frontal frame of the eyeglasses frame, the Y translation of the frontal frame of the eyeglasses, and the Z rotation of the frontal frame of the eyeglasses.

In some embodiments, as stated previously, frame points 36 are points inside the 3D bounding volume 32 that are associated with the eyeglasses frame that is positioned inside the 3D bounding volume 32. In some embodiments, in order to generate the frame points 36, any points inside the 3D bounding volume 32 of the second point cloud are removed that are within a threshold distance of any point in the first point cloud. In some embodiments, frame point generation unit 250 is configured to generate the frame points 36 by removing any points inside the bounding volume in the second point cloud that are within the threshold distance of any point in first point cloud. In some embodiments, the threshold distance is a distance that may be adjusted depending on the scanning and alignment accuracy to maximize the removal of the face region of the second point cloud and minimize the removal of eyeglasses points. In some embodiments, the remaining points in the second point cloud (e.g., frame points 36) are points that most likely belong to the eyeglasses frame. FIG. 5B illustrates frame points 36 used to place the 3D eyeglasses model 79 of a pair of eyeglasses on the face of subject 112 using the method 400 in accordance with some embodiments.

In some embodiments, at block 460, frame placement transformation recovery unit 260 determines whether a 3D eyeglasses model 291 is available (e.g., provided as a 3D eyeglasses model file in storage 206 and does not have to be created by the eyeglasses model placement system 216) or not available (e.g., not available in storage 206). In some embodiments, frame placement transformation recovery unit 260 is configured to determine whether a 3D eyeglasses model is available by, for example, scanning storage 206 to determine whether the 3D eyeglasses model file (in a format such as STL, PLY or .OBJ) is located in storage 206.

Figure 5E:
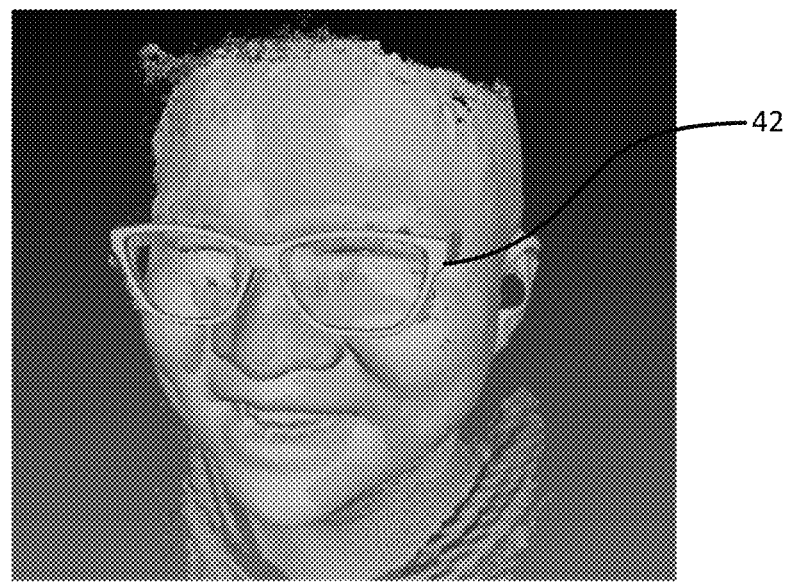
FIG. 5E illustrates a registration of an available eyeglasses model with the frame points of FIG. 5D that is utilized to place an eyeglasses model on the face of the subject of FIG. 1 in accordance with some embodiments.

In some embodiments, at block 465, when the frame placement transformation recovery unit 260 determines that the 3D eyeglasses model 291 is available, the frame placement transformation recovery unit 260 proceeds to recover and generate a first portion of the frame placement information for positioning of the 3D eyeglasses model 291. In some embodiments, the 3D eyeglasses model 291 and frame points 36 are used to recover the first portion of the frame placement information (e.g., X rotation of the frontal frame of the eyeglasses, Y rotation of the frontal frame of the eyeglasses, and Z distance of the frontal frame of the eyeglasses). In some embodiments, in order to recover the first portion of the frame placement information, the 3D eyeglasses model 291 is registered with the frame points 36 using the ICP method previously described herein. In some embodiments, the registration recovers the translational and rotational transformation of the 3D eyeglasses model 291 in first point cloud coordinate space, as illustrated in FIG. 5E. FIG. 5E illustrates an example registration of the available 3D eyeglasses model 291 and the frame points 36 that are used to place the 3D eyeglasses model 79 of a pair of eyeglasses on the face of subject 112 using the method 400 in accordance with some embodiments.

Figure 5F:
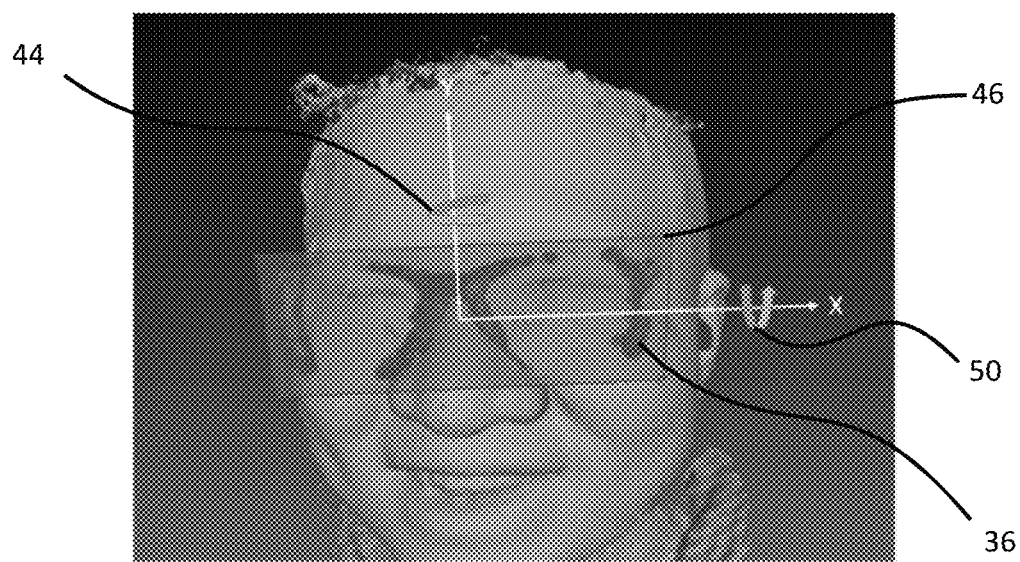
FIG. 5F illustrates a plane being fit to the frame points of FIG. 5D to recover a first portion of frame placement information utilized to place an eyeglasses model on the face of the subject of FIG. 1 in accordance with some embodiments.

In some embodiments, at block 470, when frame placement transformation recovery unit 260 determines that the 3D eyeglasses model 291 is not available for placement of the 3D eyeglasses model, frame placement transformation recovery unit 260 generates a 3D plane 46 that is used to recover the first portion of the frame placement information. That is, the 3D plane 46 (generated by, for example, frame placement transformation recovery unit 260) and frame points 36 (generated by, for example, frame point generation unit 250) are used to recover the first portion of the X rotation of the frontal frame of the eyeglasses, the Y rotation of the frontal frame of the eyeglasses, and the Z distance of the frontal frame of the eyeglasses. In some embodiments, the 3D plane 46 is fit to the frame points 36 by frame placement transformation recovery unit 260 using, for example, a Random sample consensus (RANSAC) method. The RANSAC method is a plane fitting method that is configured to generate a 3D plane that minimizes the distance errors of majority of points to the plane. In some embodiments, the plane fitting technique recovers the Z distance of the 3D plane 46 to the origin and two rotational transformations (a first rotational transformation 50 around the X axis and a second rotational transformation 44 around the Y axis) of the eyeglasses represented by the frame points 36. FIG. 5F illustrates an example 3D plane that is fit to the frame points 36 used to place the 3D eyeglasses model 79 of a pair of eyeglasses on the face of subject 112 using the method 400 in accordance with some embodiments.

Figure 5G:
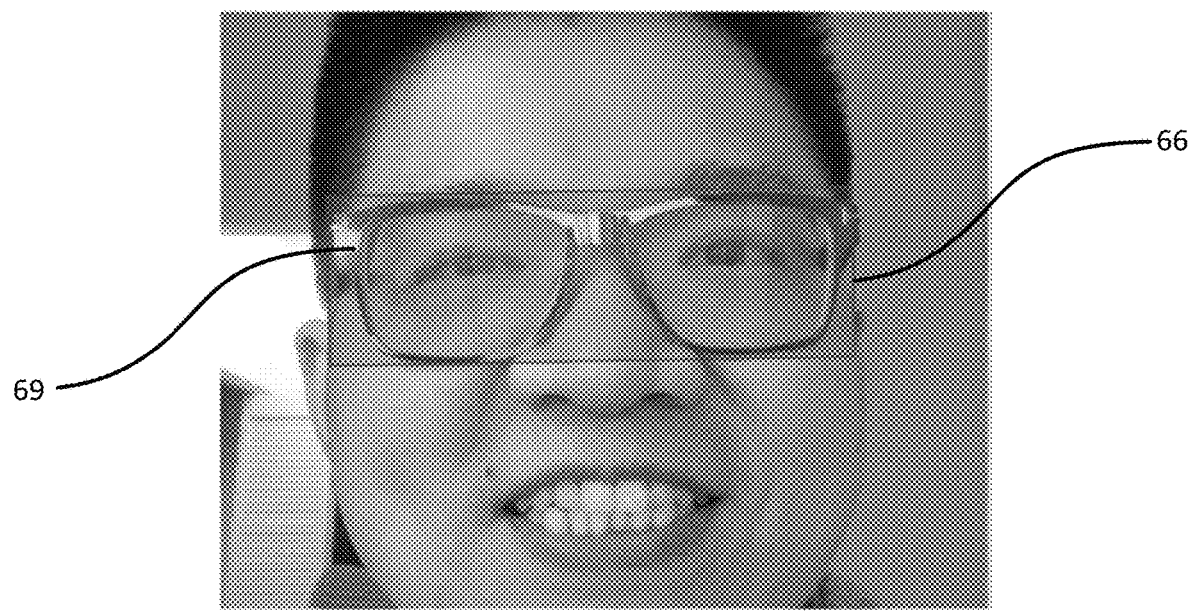
FIG. 5G illustrates a recovery of a second portion of frame placement information utilized to place an eyeglasses model on the face of the subject of FIG. 1 in accordance with some embodiments.
Figure 5H:
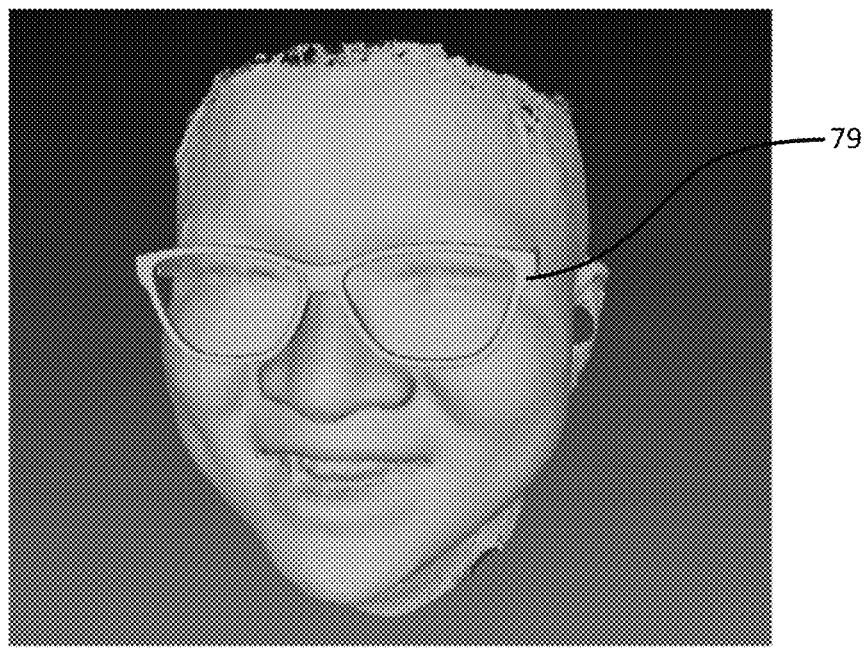
FIG. 5H illustrates an eyeglasses model placed on a face model generated by the system of FIG. 1 in accordance with some embodiments.
Figure 5I:
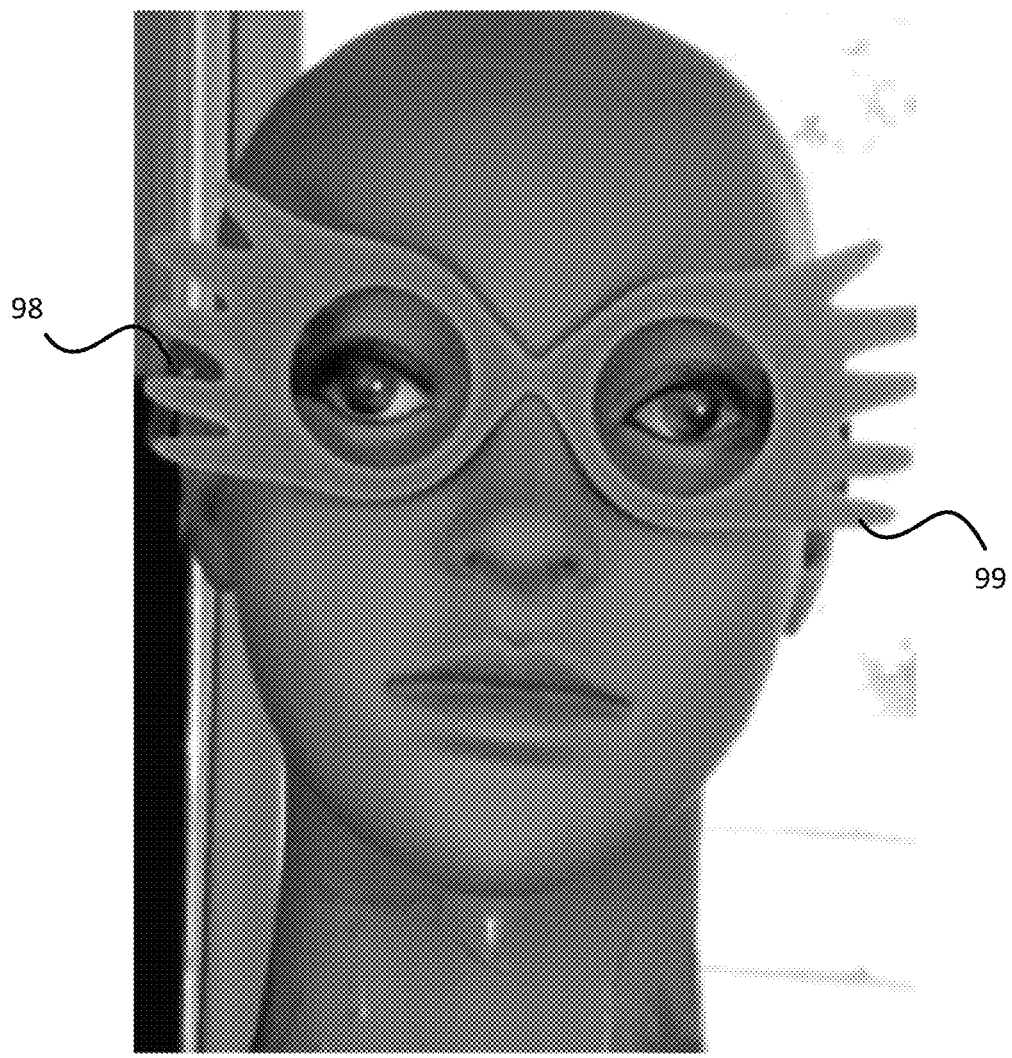
FIG. 5I illustrates a pair of eyeglasses with external markers on a subject that are used to place an eyeglasses model on a face of the subject in accordance with some embodiments.

In some embodiments, at block 475, the second portion of frame placement information (e.g., an X translation of the frontal frame of the eyeglasses frame, a Y translation of the frontal frame of the eyeglasses frame, and a Z rotation of the frontal frame of the eyeglasses frame) is recovered using the frontal image 24 of FIG. 5A. In some embodiments, since the frontal image 24 is a color image captured with the 3D face scan, a transformation from the image space to the first point cloud coordinate space may be ascertained by the frame placement transformation recovery unit 260 of eyeglasses model placement system 216. In some embodiments, the Z axis rotation angle is recovered by finding a minimized bounding box 66 around the frame image boundaries of, for example, eyeglasses frame 69 (illustrated in FIG. 5G). In some embodiments, the minimized bounding box 66 is the smallest possible bounding box that can be generated to surround, for example, the eyeglasses frame 69. In some embodiments, the minimized bounding box 66 is detected using an edge detector, such as, for example, Canny edge detection (https://en.wikipedia.org/wiki/Canny_edge_detector). In some embodiments, the center of the bounding box may be used to recover the X translation and the Y translation in the image space, which is transformed to compute the X translation and Y translation in the first point cloud space (e.g., point cloud 1) space, as illustrated in FIG. 5G. In some embodiments, frame placement transformation recovery unit 260 is configured to generate the bounding box that is used to recover the second portion of the frame placement information. FIG. 5G illustrates the recovery of the second portion of the frame placement information (e.g., X translation, Y translation, and Z rotation) that is used to place the 3D eyeglasses model of a pair of eyeglasses on the face of subject 112 using the method 400 in accordance with some embodiments.

In some embodiments, at block 475, using the first portion of the frame placement information recovered at block 465 or block 470, and the second portion of the frame placement information recovered at block 475, a 3D eyeglasses model 79 of a pair of eyeglasses is placed on the face model of the subject 112. In some embodiments, eyeglasses model placement unit 270 of FIG. 2B uses the first portion of the frame placement information recovered at block 465 or block 470, and the second portion of the frame placement information recovered at block 475 to place the 3D eyeglasses model 79 of a pair of eyeglasses on the face model of the subject 112. That is, with the transformation recovered using the method 400 described herein, the associated frame placement information allows the 3D eyeglasses model 79 of the pair of eyeglasses to be placed on the subject 112. Thus, by using the method 400, the system is an improvement over other systems, in that, for example, the subject 112 is now able to virtually try-on various pairs of eyeglasses without having to physically try on the various pairs of eyeglasses.

In some embodiments, the processing system 105 may be used to compute the transformation of a pair of eyeglasses on the face of the subject 112 but may not generate the eyeglasses model itself (only the placement of the eyeglasses on the face of the subject 112). In some embodiments, if an eyeglasses model of the eyeglasses physically worn by the subject 112 during the scanning process is provided to processing system 105 as input, the processing system 105 places the eyeglasses model on the face of the subject 112 using the computed transformation. In some embodiments, if the eyeglasses model is not given as input, the output of the processing system 105 may simply be a transformation. In some embodiments, it is possible to apply such transformation computed in both cases to other eyeglasses models (not necessary the eyeglasses physically worn by the user) for the purpose of virtual try-on of other eyeglasses with similar size. In some embodiments, for virtual try-on purposes, the computed transformation may apply to various or other models of eyeglasses that are similar in size.

In some embodiments, there may be circumstances in which the frame of the eyeglasses being worn by the subject 112 is too thin to be scanned properly by face scanner 110 or the surface material on the frame of the eyeglasses is not suitable for scanning by face scanner 110 (e.g., glossy surfaces, or translucent materials). In such embodiments, when the eyeglasses frame is too thin or the surface material is not suitable for scanning, the 3D face scan may not generate enough frame points for the accurate recovery of the frame placement information. In such embodiments, external markers 98, depicted by example in FIG. 5I, may be clipped or attached onto the frame of the eyeglasses to provide a sufficient scan area. Alternatively, in some embodiments, the subject 112 may be propositioned to wear specially designed eyewear during the facial scanning process, such as, for example, specially designed eyewear 99, that is configured to allow for the recovery of frame placement information used to place the pair of eyeglasses on the face model of subject 112, as illustrated by example in FIG. 5I.

In some embodiments, a computer-implemented method includes receiving a without-eyeglasses face scan of a subject, the without-eyeglasses face scan being a three-dimensional (3D) model of a face of the subject without eyeglasses; receiving a with-eyeglasses face scan of the subject, the with-eyeglasses face scan being a 3D model of the subject with eyeglasses; and using the without-eyeglasses face scan and the with-eyeglasses face scan to place a 3D eyeglasses model on a face model of the subject.

In some embodiments of the computer-implemented method, the 3D eyeglasses model is placed on the face model of the subject using frame placement information, the frame placement information including a first portion of the frame placement information and a second portion of the frame placement information.

In some embodiments of the computer-implemented method, the first portion of the frame placement information includes an X rotation of a frontal frame of an eyeglasses frame, a Y rotation of the frontal frame of the eyeglasses frame, a Z distance from the frontal frame to an origin on a face of a face model, and the second portion of the frame placement information includes an X translation of the frontal frame of the eyeglasses frame, a Y translation of the frontal frame of the eyeglasses frame, and a Z rotation of the frontal frame of the eyeglasses frame.

In some embodiments of the computer-implemented method, the first portion of the frame placement information is generated using frame points and a 3D plane.

In some embodiments of the computer-implemented method, the frame points are generated using a 3D bounding volume.

In some embodiments of the computer-implemented method, the first portion of the frame placement information is generated by fitting the 3D plane to the frame points.

In some embodiments of the computer-implemented method, the second portion of the frame placement information is generated using a frontal image of the without-eyeglasses face scan.

In some embodiments of the computer-implemented method, a bounding box is used to generate the X translation of the frontal frame of the eyeglasses frame, the Y translation of the frontal frame of the eyeglasses frame, and the Z rotation of the frontal frame of the eyeglasses frame.

In some embodiments, a device includes a processor; and a memory in communication with the processor for storing instructions, which when executed by the processor causes the device to: receive a without-eyeglasses face scan of a subject, the without-eyeglasses face scan being a three-dimensional (3D) model of the face of the subject without eyeglasses; receive a with-eyeglasses face scan of the subject, the with-eyeglasses face scan being a 3D model of the subject with eyeglasses; and use the without-eyeglasses face scan and the with-eyeglasses face scan to place a 3D model of a pair of eyeglasses on a face model of the subject.

In some embodiments of the device, the 3D eyeglasses model is placed on the face model of the subject using frame placement information, the frame placement information including a first portion of the frame placement information and a second portion of the frame placement information.

In some embodiments of the device, the first portion of the frame placement information includes an X rotation of a frontal frame of an eyeglasses frame, a Y rotation of the frontal frame of the eyeglasses frame, a Z distance from the frontal frame to an origin on a face of a face model, and the second portion of the frame placement information includes an X translation of the frontal frame of the eyeglasses frame, a Y translation of the frontal frame of the eyeglasses frame, and a Z rotation of the frontal frame of the eyeglasses frame.

In some embodiments of the device, the first portion of the frame placement information is generated using frame points and a 3D plane.

In some embodiments of the device, the frame points are generated using a 3D bounding volume.

In some embodiments of the device, in order to generate the first portion of the frame placement information, the 3D plane is fit to the frame points.

In some embodiments of the device, the second portion of the frame placement information is generated using a frontal image of the without-eyeglasses face scan.

In some embodiments of the device, a bounding box is used to generate the X translation of the frontal frame of the eyeglasses frame, the Y translation of the frontal frame of the eyeglasses frame, and the Z rotation of the frontal frame of the eyeglasses frame.

In some embodiments, a method includes generating eye landmarks from a without-eyeglasses face scan of a subject; generating a bounding volume of a frontal frame of eyeglasses using the eye landmarks; generating frame points from the without-eyeglasses face scan and a with-eyeglasses face scan inside the bounding volume; and using the frame points and a frontal image of the without-eyeglasses face scan to generate frame placement information associated with a positioning of a 3D eyeglasses model on a face model.

In some embodiments of the method, the frame points are used to recover an X rotation of a frontal frame of an eyeglasses frame, a Y rotation of the frontal frame of the eyeglasses frame, and a Z distance of the frontal frame of the eyeglasses frame.

In some embodiments of the method, a plane is fit to the frame points in order to generate the X rotation of the frontal frame of the eyeglasses frame, the Y rotation of the frontal frame of the eyeglasses frame, and the Z distance of the frontal frame of the eyeglasses frame.

In some embodiments of the method, the frontal image of the without-eyeglasses face scan is used to recover an X translation of the frontal frame of the eyeglasses frame, a Y translation of the frontal frame of the eyeglasses frame, and a Z rotation of the frontal frame of the eyeglasses frame.

What is claimed is:

1. A non-transitory computer-readable storage medium storing instructions that, when executed by a computing system, cause the computing system to:
   generate eye landmarks from a without-eyeglasses face scan of a subject, the without-eyeglasses face scan being a three-dimensional (3D) model of a face of the subject without eyeglasses;
   generate a bounding volume of a frontal frame of eyeglasses using the eye landmarks;
   generate frame points from the without-eyeglasses face scan and a with-eyeglasses face scan inside the bounding volume; and
   use the frame points and a frontal image of the without-eyeglasses face scan to generate frame placement information associated with a positioning of a 3D eyeglasses model on a face model.

2. The non-transitory computer-readable storage medium of claim 1, wherein:
   the frame placement information includes a first portion of the frame placement information and a second portion of the frame placement information.

3. The non-transitory computer-readable storage medium of claim 2, wherein:
   the first portion of the frame placement information includes an X rotation of a frontal frame of an eyeglasses frame, a Y rotation of the frontal frame of the eyeglasses frame, a Z distance from the frontal frame to an origin on the face model, and the second portion of the frame placement information includes an X translation of the frontal frame of the eyeglasses frame, a Y translation of the frontal frame of the eyeglasses frame, and a Z rotation of the frontal frame of the eyeglasses frame.

4. The non-transitory computer-readable storage medium of claim 2, wherein: the first portion of the frame placement information is generated using the frame points and a 3D plane.

5. The non-transitory computer-readable storage medium of claim 4, wherein:
   the frame points are generated using the bounding volume.

6. The non-transitory computer-readable storage medium of claim 4, wherein:
   the first portion of the frame placement information is generated by fitting the 3D plane to the frame points.

7. The non-transitory computer-readable storage medium of claim 2, wherein:
   the second portion of the frame placement information is generated using a frontal image of the without-eyeglasses face scan.

8. The non-transitory computer-readable storage medium of claim 3, wherein:
   the bounding volume is used to generate the X translation of the frontal frame of the eyeglasses frame, the Y translation of the frontal frame of the eyeglasses frame, and the Z rotation of the frontal frame of the eyeglasses frame.

9. A device, comprising:
   a processor; and
   a memory in communication with the processor for storing instructions, which when executed by the processor causes the device to:
   generate eye landmarks from a without-eyeglasses face scan of a subject;
   generate a bounding volume of a frontal frame of eyeglasses using the eye landmarks;
   generate frame points from the without-eyeglasses face scan and a with-eyeglasses face scan inside the bounding volume; and
   use the frame points and a frontal image of the without-eyeglasses face scan to generate frame placement information associated with a positioning of a 3D model of a pair of eyeglasses on a face model.

10. The device of claim 9, wherein:
    the frame placement information includes a first portion of the frame placement information and a second portion of the frame placement information.

11. The device of claim 10, wherein:
    the first portion of the frame placement information includes an X rotation of a frontal frame of an eyeglasses frame, a Y rotation of the frontal frame of the eyeglasses frame, a Z distance from the frontal frame to an origin on the face model, and the second portion of the frame placement information includes an X translation of the frontal frame of the eyeglasses frame, a Y translation of the frontal frame of the eyeglasses frame, and a Z rotation of the frontal frame of the eyeglasses frame.

12. The device of claim 10, wherein: the first portion of the frame placement information is generated using the frame points and a 3D plane.

13. The device of claim 12, wherein:
    the frame points are generated using the bounding volume.

14. The device of claim 12, wherein:
    in order to generate the first portion of the frame placement information, the 3D plane is fit to the frame points.

15. The device of claim 10, wherein:
    the second portion of the frame placement information is generated using a frontal image of the without-eyeglasses face scan.

16. The device of claim 11, wherein:
    a bounding box is used to generate the X translation of the frontal frame of the eyeglasses frame, the Y translation of the frontal frame of the eyeglasses frame, and the Z rotation of the frontal frame of the eyeglasses frame.

17. A method, comprising:
    generating eye landmarks from a without-eyeglasses face scan of a subject;
    generating a bounding volume of a frontal frame of eyeglasses using the eye landmarks;
    generating frame points from the without-eyeglasses face scan and a with-eyeglasses face scan inside the bounding volume; and
    using the frame points and a frontal image of the without-eyeglasses face scan to generate frame placement information associated with a positioning of a 3D eyeglasses model on a face model.

18. The method of claim 17, wherein:
the frame points are used to recover an X rotation of a frontal frame of an eyeglasses frame, a Y rotation of the frontal frame of the eyeglasses frame, and a Z distance of the frontal frame of the eyeglasses frame.

19. The method of claim 18, wherein:
a plane is fit to the frame points in order to generate the X rotation of the frontal frame of the eyeglasses frame, the Y rotation of the frontal frame of the eyeglasses frame, and the Z distance of the frontal frame of the eyeglasses frame.

20. The method of claim 17, wherein:
the frontal image of the without-eyeglasses face scan is used to recover an X translation of the frontal frame of the eyeglasses frame, a Y translation of the frontal frame of the eyeglasses frame, and a Z rotation of the frontal frame of the eyeglasses frame.

* * * * *